United States Patent [19]

Chang et al.

[11] Patent Number: 5,838,777
[45] Date of Patent: Nov. 17, 1998

[54] APPARATUS FOR AUTO-DETECTING DIALING OF A PARALLEL COMMUNICATION DEVICE

[75] Inventors: Jackson Chang; Jeffrey Lai; Taing Xu; James Yin, all of Taipei, Taiwan

[73] Assignee: Inventec Corporation, Taipei, Taiwan

[21] Appl. No.: 808,379

[22] Filed: Feb. 28, 1997

[51] Int. Cl.$^6$ .......................... H04M 1/56; H04M 15/06; H04M 1/00; H04M 3/00

[52] U.S. Cl. ...................... 379/142; 379/354; 379/93.23; 379/157; 379/177; 379/164

[58] Field of Search ..................... 379/142, 156, 379/157, 164, 171, 245, 246, 247, 257, 118, 120, 198, 93.23, 354, 93.17, 177

[56] References Cited

U.S. PATENT DOCUMENTS

| | | | |
|---|---|---|---|
| 4,924,496 | 5/1990 | Figa et al. | 379/142 |
| 5,386,460 | 1/1995 | Boakes et al. | 379/142 |
| 5,398,279 | 3/1995 | Frain | 379/142 |
| 5,425,089 | 6/1995 | Chan et al. | 379/142 |
| 5,446,785 | 8/1995 | Hirai | 379/142 |
| 5,490,205 | 2/1996 | Kondo et al. | 379/67 |
| 5,506,895 | 4/1996 | Hirai et al. | 379/142 |
| 5,596,631 | 1/1997 | Chen | 379/142 |
| 5,692,038 | 11/1997 | Kraus et al. | 379/142 |
| 5,699,419 | 12/1997 | Ardon | 379/156 |

*Primary Examiner*—Curtis A. Kuntz
*Assistant Examiner*—Rexford N. Barnie
*Attorney, Agent, or Firm*—McDermott, Will & Emery

[57] ABSTRACT

The present invention relates to an auto-detecting dialing communication system used to make the display of caller numbers in host or communication system consist with that of an extension telephone or communication system, especially relates to an extension telephone or communication system that can also display caller numbers.

The present invention offer a device for auto-detecting dialing of a parallel communication system, which composes: (1) a FSK decoder for acquiring a dial-in number. (2) an extension telephone detecting device for detecting whether the extension telephone is off hook. (3) a memory for storing the caller telephone numbers. (4) a ring-back signal detecting device for examining whether a ring-back signal is sent back. (5) a Dual Tone Multiple Frequency (DTMF) decoder for acquiring the outgoing call number. (6) a processor for sequentially proceeding with output signals of the FSK (Frequency Shift keying) decoder, the extension telephone detecting device, the memory, the ring-back signal detecting device and the DTMF (Dual Tone Multiple Frequency)decoder according to an order.

23 Claims, 2 Drawing Sheets

APPARATUS FOR AUTO-DETECTING DIALING OF A PARALLEL COMMUNICATION DEVICE

BACKGROUND OF THE INVENTION

1. Field of the Invention

The present invention relates to an auto-detecting dialing communication system used to make the display of caller numbers in a host or communication system consistent with that of an extension telephone or communication system, especially relates to an extension telephone or communication system that can also display caller numbers.

The telephone that can display caller numbers is called caller identification telephone, some can show whether a caller's number is replied or not, by way of displaying "unanswered" or "answered". This kind of telephone is called displaying caller identification telephone. The present invention provides apparatus for auto-detecting dialing of every caller identification telephone, and make every caller identification telephone have the same display in every parallel communication system.

2. Description of the Prior Art

Nowadays many types of caller identification telephones can display the incoming caller numbers with the display "unanswered" or "answered", which are then stored in a memory.

If an incoming call is replied by the user, the display of the incoming call will change from "unanswered" to "answered". FIG. 1 shows the block diagram of a traditional caller identification telephone. When an incoming call is coming, the frequency shift keying (FSK) decoder 11 decodes the FSK signal, which is then processed by a micro-processor 12, and the resulting caller number is stored in a memory 13, and displayed in a Liquid Crystal Display (LCD) 14.

On the other hand, when the user dials out, the micro-processor 12 compares the outgoing call number with all the incoming caller numbers stored in memory 13. If one of the incoming caller numbers is the same with the outgoing call number, then micro-processor 12 changes the display from "unanswered" to "answered" and stores it.

The traditional caller identification telephones in a parallel circuit may not have the same display because either host or extension can not acquire the outgoing call number of the others. This condition causes the error in the display of incoming caller numbers between host and extension telephones.

Communication systems or telephones are usually connected in parallel. If two or more of them are displaying caller identification telephone numbers and an incoming call is answered by one of them, the display of the answering telephone will be different from that of the others. Another condition which makes the display different is that when a user dials an outgoing call number, the display of the telephone used by the user will be different from the others.

For those reasons mentioned above, clearly a caller identification telephone is unable to detect outgoing caller number sent by an extension telephone so the display may be different between every extension telephone. This disadvantage of traditional caller identification telephone may make the user confused, making the function of displaying caller identification telephone useless. To make the traditional caller identification telephone actually work, it is important to make it able to detect the outgoing call number of the other parallel caller identification telephones and whether an incoming call is answered by any of them.

SUMMARY OF THE INVENTION

As the disadvantage mentioned in the background of the invention, traditional caller identification telephone is not responsive to the dialing of the other parallel caller identification telephones so the caller number displayed "unanswered" may actually be answered by another parallel caller identification telephone. This is the reason why the caller identification telephone becomes useless in a parallel circuit. The present invention can make the parallel telephone able to respond to the dialing of the other parallel telephone, so that the display of every telephone in a parallel circuit becomes the same. Thus the function of displaying caller identification telephone can actually work.

For the previously described purpose, the present invention offers a device that can make the traditional caller identification telephone able to acquire the dialing of a parallel telephone, thus the display of every telephone in a parallel circuit becomes the same. The present invention contains a traditional caller identification telephone; an extension telephone detecting device; a ring-back signal detecting device; a Dual Tone Multiple Frequency (DTMF) decoder and a processor.

DESCRIPTION OF THE PREFERRED EMBODIMENT

The present invention provides a device that not only makes the traditional caller identification telephone in a parallel circuit to detect the dialing of one another but also enable the display of every caller's number in all the parallel telephone to be proper and consistent. The device of the present invention contains a traditional caller identification telephone; an extension telephone detecting device; a Dual Tone Multiple Frequency (DTMF) decoder; a ring-back signal detecting device and a processor. The block diagram is shown in FIG. 2 and the principle by which the device works is described below.

Figure 1:
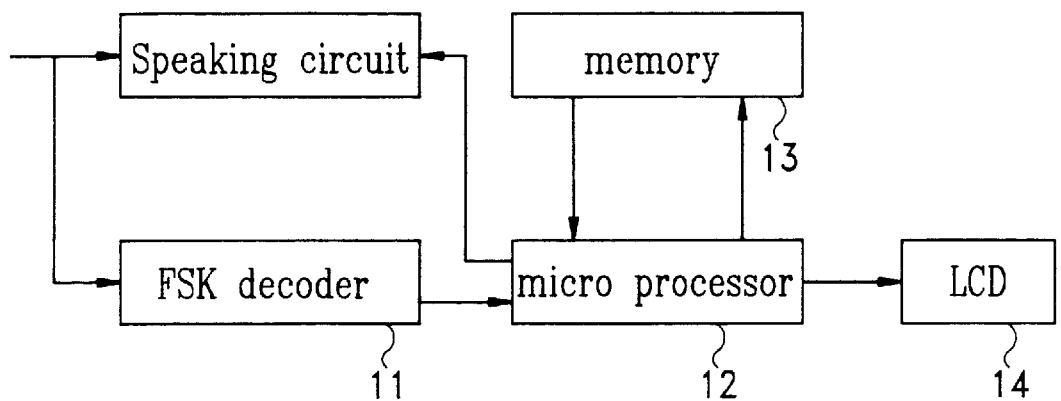
FIG. 1 is the block diagram of a traditional caller identification telephone.
Figure 2:
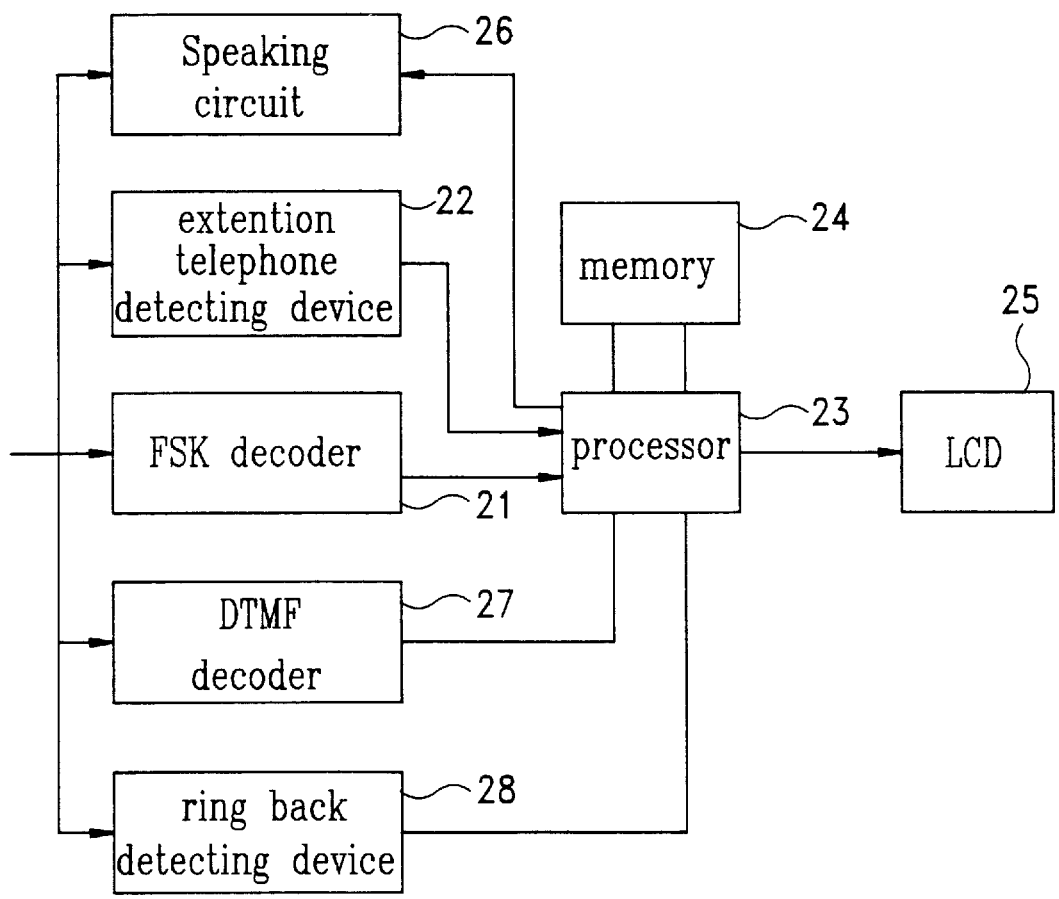
FIG. 2 is the block diagram of the caller identification telephone of the present invention.

Referring to FIG. 2, when an incoming call is detected, the FSK decoder 21 acquires the incoming caller's number by decoding the FSK signal sent by the exchange. If the host gets off hook to answer the call, the display is set "answered" and is stored together with the incoming call number. Otherwise the display is set "unanswered", and extension telephone detecting device 22 detects whether any extension telephone is off hook. If it does, the display is changed from "unanswered" to "answered".

Another condition is that when a user dials a number out, processor 23 detects whether the ring-back signal ends during the time interval that the user is still on line, it shows that this outgoing call is successfully connected, and the processor 23 compares the outgoing call number with the call numbers stored in memory 24. The display of the identical call number is changed from "unanswered" to "answered" if there is one (or more) caller number(s) the same with the outgoing call number. The next step is to store the display together with the caller number(s). To display caller numbers and display, processor 23 sends the caller numbers stored in memory 24 to LCD 25.

The DTMF decoder 27 of the present invention shown in FIG. 2 is preferably constructed by integrated circuit fabricated on a chip numbered TOSHIBA TC35310. The purpose of DTMF decoder 27 is to detect the outgoing call number sent by parallel (extension) telephone. Accordingly the processor 23 could compare the outgoing call number with the caller numbers stored in memory 24. The ring-back signal detecting device 28 is used to detect whether the outgoing call is successfully connected. If it does, the processor 23 compare; the outgoing call number with the caller numbers stored in memory 24. The speaking circuit 26 has the same function as the speaking circuit in the prior art.

A DTMF decoder, a ring-back signal detecting device and an extension telephone detecting device of the present invention is used in a traditional communication device. For example, the DTMF decoder is used to perform the remote control of answer machine. The ring-back signal detecting device is used to detect whether a ring-back signal is sent back by the exchange after the call is dialed. If the ring-back signal ends while the extension telephone is still off hook, it is known that this call is successfully connected. For the reason mentioned above, ring-back detecting device can be used to count the fee of the use in the traditional communication device. The extension telephone detector is used in the host to show the user whether the extension telephone is off hook. According to the previously mentioned reasons, though the DTMF detecting device, ring-back signal detecting device and the extension telephone detector are used in the prior art, the present invention integrated them in a system with the same construction to perform a very different function from that of the prior art. This is why the details of the construction of the three device is not described in the preferred embodiment. Because the FSK decoder is widely used in the prior art, the construction is then roughly described.

The DTMF decoder is a decoding integrated circuit fabricated on a chip numbered TOSHIBA TC35310. The ring-back signal detecting device is mainly constructed by a band pass filter which can amplify a signal, and a phase lock loop circuit, both of them have a center frequency at 450 Hz. Because a ring-back signal is a signal of intermittent complex frequency 450 Hz+400 Hz, the portion of ring-back signal with frequency 450 Hz can pass through the band pass filter and be amplified. The ring-back signal is transformed to an intermittent low voltage signal after being sent to the phase loop. Whenever the intermittent low voltage signal is fed to a CPU, it is known that a outgoing call is ringing. The extension telephone detecting device is mainly constructed by a bridge rectifier and a voltage-output circuit. When the output level of voltage signal is low, it would know that an extension telephone is off hook.

Figure 3:
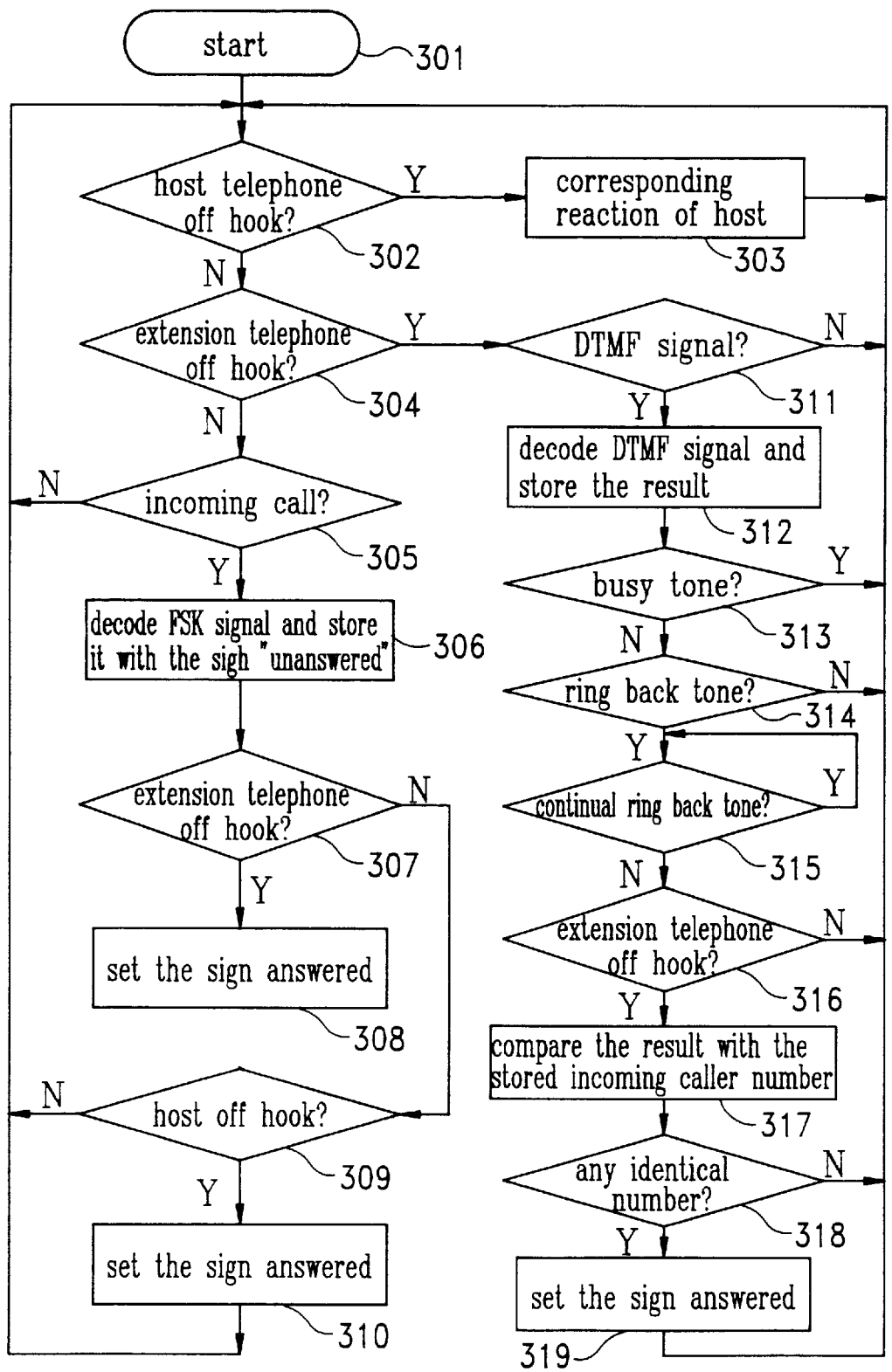
FIG. 3 is the flow chart of a program stored in a processor that controls the system.

Every step that the auto-detecting dialing device proceeds with is predetermined by a program deposited in processor 23. The flow chart of the program is shown in FIG. 3. The principle of the program is described below.

Referring to FIG. 3, the beginning of the program is step 301 and the following is step 302 that is to determine whether the host is off hook. The "yes" branch is selected in step 302 and then proceed with step 303 to take the corresponding reaction of host, which may answer the incoming call or compare the incoming caller number with all the caller numbers. The next step is to resume step 302 to repeat all the procedures of this program. If the host is not off hook, the "no" branch is selected in step 302. The following step of the "no" branch in step 302 is step 304 that determines whether the extension telephone is off hook. If there is any extension telephone off hook, the "yes" branch is selected in step 304 to proceed with the extension telephone procedure. Whereas if there is no extension telephone off hook, the "no" branch is selected in step 304 to proceed with the new incoming call procedure.

The new incoming call procedure includes the steps described below. Step 305 is to determine whether there is an incoming call ringing. If there is no incoming call coming, the "no" branch is selected in step 305 and then resumes step 302 to repeat all the procedures of this program. If there is an incoming call coming, the "yes" branch is selected in step 305 . The next step is step 306 which decodes the FSK signal and store the result of decoding with the display "unanswered" then proceed with step 307 to determines whether the extension telephone is off hook. If there is any extension telephone off hook, the "yes" branch is selected in step 307 to proceed with step 308 which is to set the display "answered". Whereas if there is no extension telephone off hook, the "no" branch is selected in step 307 to proceed with step 309 to determine whether the host is off hook. If the host is not off hook, the "no" branch is selected in step 309 and then resume step 302 to repeat all the procedures of this program. If the host is off hook, the "yes" branch is selected in step 309 and then proceed with step 310 which is to set the display answered. Through the steps above, the new incoming call procedure return to step 302 to repeat all the procedures of this program.

The extension telephone procedure includes the steps described below. Step 311 determines whether there is the DTMF signal, if there is no DTMF signal in the parallel circuit, the "no" branch is selected in step 311 and return to step 302 to repeat all the procedures of this program. If there is any DTMF signal in the parallel circuit, the "yes" branch is selected in step 311 to proceed with step 312 that is to decode the DTMF signal and store the resulting outgoing call number.

The following step is to determine whether there is any busy tone received. If there is any busy tone detected by any communication system in the parallel circuit, return to step 302 to repeat all the procedures of this program. If there is not any busy tone detected by any communication system in the parallel circuit, proceed with step 314 to detect whether there is any ring-back tone in the parallel circuit. If no ring-back tone is detected, the "yes" branch is selected in step 314 to proceed with step 315 in order to detect whether there is a continual ring-back tone. If there is a continual ring-back tone detected in the parallel circuit, proceed with step 315 until the continual ring-back tone interrupted and then the "no" branch is selected in step 315 to proceed with step 316. Step 316 is to detect whether extension telephone is off hook, if there is not any extension telephone off hook, return to step 302 to repeat all the procedures of this program. If there is any extension on hook, proceed with step 317 to compare the result of decoded DTMF signal with the incoming caller numbers stored in the memory. The following step is step 318 that is to determine whether there is any incoming caller number stored in the memory identical with the result of decoded DTMF signal. If there is no identical telephone number, the "no" branch is selected to resume step 302 to repeat all the procedures of this program. If there is any identical telephone number in the stored incoming caller numbers, the "yes" branch is selected to proceed with step 319 to set the display of this outgoing call number "answered" and then return to step 302 to repeat all the procedures of this program.

The present invention utilize an extension telephone detecting device, a DTMF decoder, a ring-back detecting device and a traditional displaying call identification telephone added by a processor to implement the function of auto-detecting dialing of a communication system in a parallel circuit and to make every telephone in a parallel circuit has the same display. The above described function is a unreachable goal for a traditional displaying call identification telephone.

Although specific embodiments have been illustrated and described, it will be obvious to those skilled in the art that various modification may be made without departing from the spirit which is intended to be limited solely by the appended claims.

What is claimed is:

1. Apparatus for detecting dialing of a plurality of parallel-coupled telephones in a communication system, which comprising:

FSK (Frequency Shift Keying) decoding means for acquiring a dial-in number by decoding a telephone signal;

parallel device detecting means for detecting whether said plurality of parallel-coupled telephones of said parallel communication system are off hook;

storage means for storing a plurality of telephone numbers and said dial-in number of said plurality of parallel-coupled telephones;

ring-back signal detecting means for detecting whether a ring-back signal is sent to said apparatus after sending said outgoing number, to determine if an outgoing call is successfully made by said plurality of parallel-coupled telephones;

DTMF (Dual Tone Multiple Frequency) decoding means for acquiring said outgoing number by decoding a DTMF signal sent by said parallel communication system; and a processor for proceeding with a plurality of interior signals and sequentially receiving said plurality of interior signals according to an order, and make said electrical apparatus detect said outgoing number; proceed with said telephone numbers and store said dial-in number in said storage means, and either set the display "unanswered" or remain the original display on said plurality of parallel-coupled telephones, after comparing said outgoing number with said plurality of telephone numbers.

2. The apparatus as claim 1, wherein said processor comprising:

procedure means for proceeding with said plurality of interior signals according to said order.

3. The apparatus as claim 1, wherein said plurality of interior signals comprises the output signals of said FSK decoding means, said parallel device detecting means, said storage means, said ring-back signal detecting means and said DTMF detecting means.

4. The apparatus as claim 1, wherein said parallel communication system comprises a host and an extension telephone.

5. The apparatus as claim 1, wherein said order comprises the steps of:

proceeding with a host corresponding procedure, if said host is off hook, said corresponding procedure is used to: set the display of an on-line telephone number compare said on-line telephone number with said plurality of telephone numbers; edit said storage means and perform the functions of the traditional communication system such as open or close a speaking circuit;

proceeding with an extension telephone procedure, if said extension telephone is off hook, said extension telephone procedure is used to acquire said outgoing number sent by said extension telephone and compare said outgoing number with said plurality of telephone numbers followed by setting the display unanswered when this call is connect; and proceeding with an incoming call procedure, if an incoming call is ringing, said incoming call procedure is used to acquire an incoming call number and set the display of said incoming call number.

6. The apparatus as claim 5, wherein said extension telephone procedure comprises the steps of:

determining whether there is said DTMF signal;

decoding said DTMF signal and storing the result as said outgoing number in said storage means;

comparing said outgoing number with said plurality of telephone numbers after said call is connected, and setting the display of said outgoing number "answered", if there is any identical number in said plurality of telephone numbers.

7. The apparatus as claim 5, wherein said incoming call procedure comprises the steps of:

storing said incoming call number acquired by said FSK decoding means in said storage means and setting the display of said incoming call number "unanswered";

changing the display of said incoming call number "answered" if said extension telephone is off hook; and changing the display of said incoming call number to "answered" if said host is not off hook, and proceeding with said host-corresponding procedure.

8. The apparatus as claim 1, wherein said DTMF signal is generated by said parallel communication system.

9. Apparatus for detecting dialing of a plurality of parallel-coupled telephones in a communication system, which comprising:

FSK (Frequency Shift Keying) decoding means for acquiring a dial-in number by decoding a telephone signal;

parallel device detecting means for detecting whether said plurality of parallel-coupled telephones of said parallel communication system are off hook;

storage means for depositing said plurality of telephone numbers and said dial-in number of said plurality of parallel-coupled telephones;

ring-back signal detecting means for detecting whether a ring-back signal is sent to said apparatus after sending said outgoing number, to determine if an outgoing call is successfully made by said plurality of parallel-coupled telephones;

DTMF (Dual Tone Multiple Frequency) decoding means for acquiring said outgoing number by decoding a DTMF signal sent by said parallel communication system; and a processor for proceeding with a plurality of interior signals and sequentially receiving said plurality of interior signals according to an order, and make said electrical apparatus detect said outgoing number; proceed with said telephone numbers and store said dial-in number in said storage means, and either set the display "unanswered" or remain the original display on said plurality of parallel-coupled telephones, after comparing said outgoing number with said plurality of telephone numbers, said processor comprises:

procedure means for proceeding with said plurality of interior signals according to said order.

10. The apparatus as claim 9, wherein said order comprising the steps of:

proceeding with a host corresponding procedure, if said host is off hook, said corresponding procedure is used to: set the display of an on-line telephone number compare said on-line telephone number with said plurality of telephone numbers; edit said storage means and perform the functions of the traditional communication system such as open or close a speaking circuit;

proceeding with an extension telephone procedure, if said extension telephone is off hook, said extension telephone procedure is used to acquire said outgoing number sent by said extension telephone and compare said outgoing number with said plurality of telephone numbers followed by setting the display unanswered when this call is connect; and proceeding with an incoming call procedure, if an incoming call is ringing, said incoming call procedure is used to acquire an incoming call number and set the display of said incoming call number.

11. The apparatus as claim 9, wherein said plurality of interior signals comprising the output signals of said FSK decoding means, said parallel device detecting means, said storage means, said ring-back signal detecting means and said DTMF detecting means.

12. The apparatus as claim 9, wherein said parallel communication system comprising a host and an extension telephone.

13. The apparatus as claim 10, wherein said extension telephone procedure comprising the steps of:

determining whether there is said DTMF signal;

decoding said DTMF signal and storing the result as said outgoing number in said storage means; and comparing said outgoing number with said plurality of telephone numbers after said call is connected, and setting the display of said outgoing number "answered", if there is any identical number in said plurality of telephone numbers.

14. The apparatus as claim 10, wherein said incoming call procedure comprises the steps of:

storing said incoming call number acquired by said FSK decoding means in said storage means and setting the display of said incoming call number "unanswered";

changing the display of said incoming call number "answered" if said extension telephone is off hook; and changing the display of said incoming call number to "answered" if said host is not off hook, and proceeding with said host-corresponding procedure.

15. The apparatus as claim 9, wherein said DTMF signal is generated by said parallel communication system.

16. Apparatus for detecting dialing of a plurality of parallel-coupled telephones in a communication system, which comprising:

a speaking circuit for receiving and transmitting a communication signal, said communication signal is a base-band signal or a digital signal;

FSK (Frequency Shift Keying) decoding means for acquiring a dial-in number by decoding a telephone signal;

parallel device detecting means for detecting whether said plurality of parallel-coupled telephones of said parallel communication system are off hook;

storage means for depositing said plurality of telephone numbers and said dial-in number of said plurality of parallel-coupled telephones;

ring-back signal detecting means for detecting whether a ring-back signal is sent to said apparatus after sending said outgoing number, to determine if an outgoing call is successfully made by said plurality of parallel-coupled telephones;

DTMF (Dual Tone Multiple Frequency) decoding means for acquiring said outgoing number by decoding a DTMF signal sent by said parallel communication system; and a processor for proceeding with a plurality of interior signals and sequentially receiving said plurality of interior signals according to an order, and make said electrical apparatus detect said outgoing number; proceed with said telephone numbers and store said dial-in number in said storage means, and either set the display "unanswered" or remain the original display on said plurality of parallel-coupled telephones, after comparing said outgoing number with said plurality of telephone numbers, said processor comprises:

procedure means for proceeding with said plurality of interior signals according to said order.

17. The apparatus as claim 16, wherein said order comprises the steps of:

proceeding with a host corresponding procedure, if said host is off hook, said corresponding procedure is used to: set the display of an on-line telephone number compare said on-line telephone number with said plurality of telephone numbers, edit said storage means and perform the functions of the traditional communication system such as open or close said speaking circuit;

proceeding with an extension telephone procedure, if said extension telephone is off hook, said extension telephone procedure is used to acquire said outgoing number sent by said extension telephone and compare said outgoing number with said plurality of telephone numbers followed by setting the display unanswered when this call is connected; and proceeding with an incoming call procedure, if an incoming call is ringing, said incoming call procedure is used to acquire an incoming call number and set the display of said incoming call number.

18. The apparatus as claim 16, wherein said plurality of interior signals comprising the output signals of said FSK decoding means, said parallel device detecting means, said storage means, said ring-back signal detecting means and said DTMF detecting means.

19. The apparatus as claim 16, wherein said parallel communication system comprises a host and an extension telephone.

20. The apparatus as claim 17, wherein said extension telephone procedure comprising the steps of:

determining whether there is said DTMF signal; decoding said DTMF signal and storing the result as said outgoing number in said storage means; and comparing said outgoing number with said plurality of telephone numbers after said call is connected, and setting the display of said outgoing number "answered", if there is any identical number in said plurality of telephone numbers.

21. The apparatus as claim 17, wherein said incoming call procedure comprising the steps of:

storing said incoming call number acquired by said FSK decoding means in said storage means and setting the display of said incoming call number "unanswered";

changing the display of said incoming call number "answered" if said extension telephone is off hook; and changing the display of said incoming call number to "answered" if said host is not off hook, and proceed with said host-corresponding procedure.

22. The apparatus as claim 16, wherein said display means is Liquid Crystal Display(LCD).

23. The apparatus as claim 16, wherein said DTMF signal is generated by said parallel communication system.

* * * * *